United States Patent
Millman et al.

(10) Patent No.: US 6,323,875 B1
(45) Date of Patent: Nov. 27, 2001

(54) METHOD FOR RENDERING DISPLAY BLOCKS ON DISPLAY DEVICE

(75) Inventors: Steven Edward Millman, Spring Valley; Kevin Wilson Warren, Fishkill, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,912

(22) Filed: Apr. 28, 1999

(51) Int. Cl.$^7$ ........................................... G06K 9/40
(52) U.S. Cl. ..................... 345/619; 345/501; 345/204; 345/581; 345/717
(58) Field of Search ................... 345/115, 132, 345/441, 440, 116, 112, 501, 204, 581, 717

(56) References Cited

U.S. PATENT DOCUMENTS

| | | | |
|---|---|---|---|
| 4,965,559 | * 10/1990 | Dye | 340/717 |
| 5,418,962 | * 5/1995 | Bodin et al. | 395/700 |
| 5,491,813 | * 2/1996 | Bondy et al. | 395/500 |
| 5,694,150 | * 12/1997 | Sigona et al. | 345/145 |
| 5,748,866 | * 5/1998 | Edgar | 395/128 |
| 5,990,909 | * 11/1999 | Kwak | 345/503 |
| 6,025,840 | * 2/2000 | Taylor | 345/340 |
| 6,104,359 | * 8/2000 | Endres et al. | 345/3 |

OTHER PUBLICATIONS

Fuchs, H., "Distributing A Visible Surface Algorithm Over Multiple Processors", Proceedings of ACM Annual Conference, Oct. 1977, pp. 449–451.

Diede, et al., "The Titan Graphics Supercomputer Architecture", Computer vol. 21(9), 1988, pp. 13–30.

bcatlin@my–dejanews.com, "Display filter driver", Deja News, Nov. 20, 1998.

Foley, et al., "Computer Graphics: Principles and Practice" Second Edition, Copyright 1990 by Addison–Wesley Publishing Company, Inc., pp. 67–144; pp. 170–184; pp. 201–283; pp. 855–920; pp. 436–468.

Shanley et al., "PCI System Architecture", Third Edition, Copyright 1995 by Mindshare, Inc., pp. 329–333.

Akeley et al., "High–Performance Polygon Rendering", Computer Graphics, vol. 22, No. 4, Aug. 1988, pp. 239–246.

Apgar, et al., "A Display System for the Stellar™ Graphics Supercomputer Model GS1000™", Computer Graphics, vol. 22, No. 4, Aug. 1988, pp. 255–262.

(List continued on next page.)

Primary Examiner—Matthew Luu
Assistant Examiner—Daniel J Chung
(74) Attorney, Agent, or Firm—F. Chau & Associates, LLP

(57) ABSTRACT

A method is provided for rendering display blocks on a video display device of a computer processing system having an existing display driver. The method includes the step of assigning each of a plurality of n video adapters to an $m^{th}$ display subregion of the display device. A call to a draw function of the existing display driver is received. The draw function corresponds to a particular shape to be drawn and includes starting and ending coordinates. The $m^{th}$ display subregion that drawing of the shape is to begin on is calculated from the starting coordinates. A function of the existing display driver is called by calling an address stored in the filter driver of a routine corresponding to the called function. The called function corresponds to the received draw function. A segment of the shape is rendered on the calculated $m^{th}$ display subregion by the $n^{th}$ display adapter corresponding thereto. A traversal is made to the $n^{th}$ video adapter corresponding to a next segment of the shape. The next segment of the shape is rendered on the $m^{th}$ display subregion corresponding to the traversed $n^{th}$ video adapter. The traversal and second rendering step are repeated until all segments of the shape have been rendered.

27 Claims, 7 Drawing Sheets

OTHER PUBLICATIONS

Torborg, J., "A Parallel Processor Architecture for Graphics Arithmetic Operations", Computer Graphics, vol. 21, No. 4, Jul. 1987, pp. 197–204.

Parke, F., "Simulation And Expected Performance Analysis Of Multiple Processor Z–Buffer Systems", Computer Graphics, Jul. 1980, pp. 48–56.

Gharachorloo, et al., "Subnanosecond Pixel Rendering with Million Transistor Chips", Computer Graphics, vol. 22, No. 4, Aug. 1988, pp. 41–49.

Fuchs, et al., "Pixel–Planes 5: A Hetergeneous Multiprocessor Graphics System Using Processor–Enhanced Memories", Computer Graphics, vol. 23, No. 3, Jul. 1989, pp. 79–88.

Fuchs, et al., "A system for automatic acquisition of three–dimensional data", Proceedings of National Computer Conference, 1977, pp. 49–53.

Runyon S., "AT&T Goes To 'Warp Speed' With Its Graphics Engine", Electronics Magazine, Jul. 23, 1987, pp. 54–56.

* cited by examiner

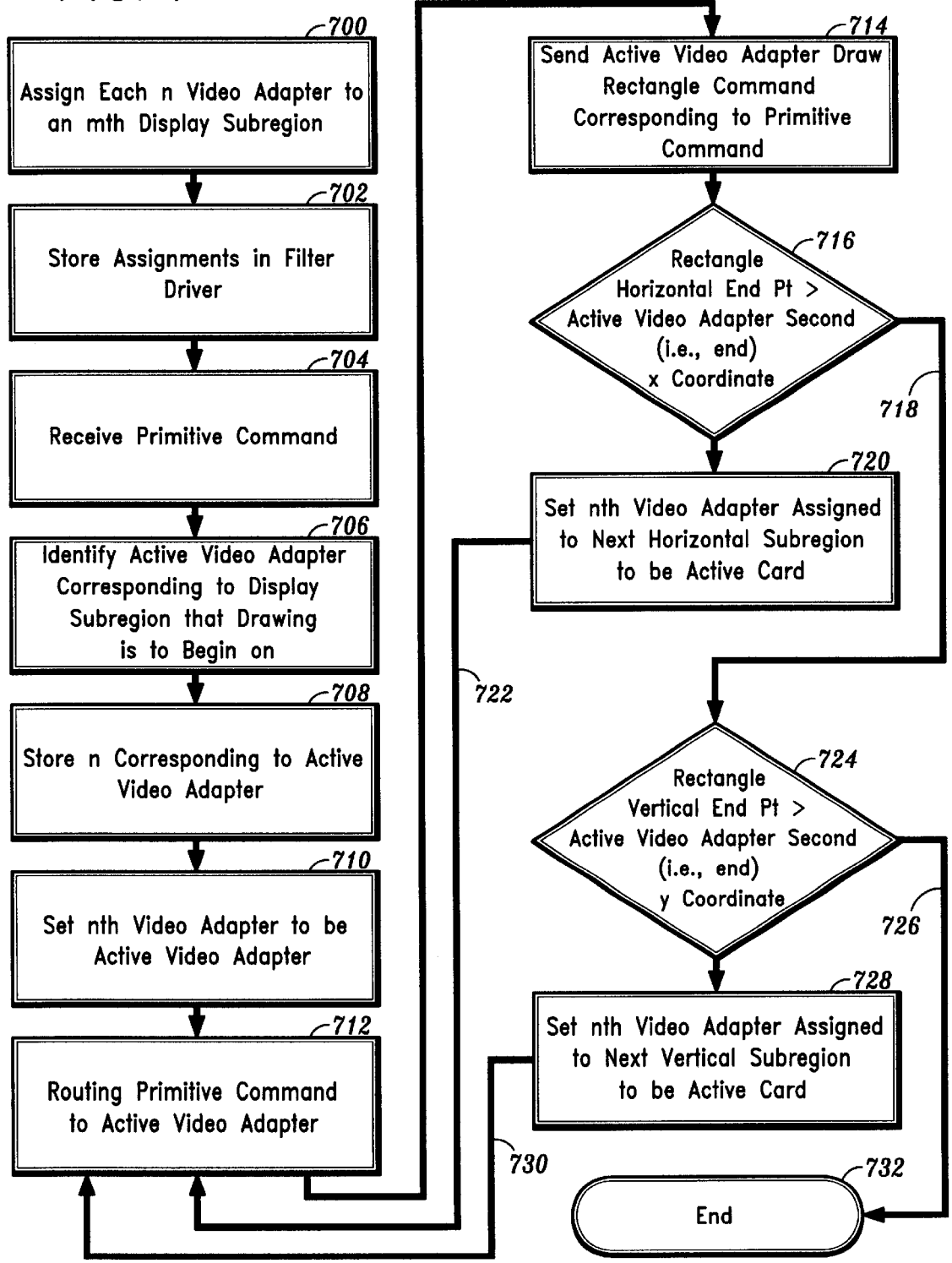

METHOD FOR RENDERING DISPLAY BLOCKS ON DISPLAY DEVICE

BACKGROUND

1. Technical Field

The present invention relates generally to computer processing systems and, in particular, to a method for rendering display blocks on a display device of a computer processing system.

2. Background Description

FIG. 1 is a block diagram of a display subsystem 100 of a computer processing system according to the prior art. In particular, the display subsystem 100 corresponds to a computer processing system running a Windows NT or other modern operating system. The components of the display subsystem 100 are implemented as a combination of software and hardware.

The display subsystem includes a User Mode and a Kernel Mode. The User Mode includes one or more application programs (hereinafter "application program") 102, and an application level interface (API) 104. The application level interface 104 includes a Graphics Driver Interface (GDI) 104a and a Direct Draw (DD) and Direct 3D (D3D) interface (hereinafter collectively referred to as "DD/D3D interfaces", unless only one of the two is to be described or referred to, in which they shall be respectively referred to as "DD interface" and "D3D interface", in all cases having the reference character 104b).

The Kernel Mode includes a graphics engine (GRE) 106a corresponding to the GDI 104a, and Kernel mode Direct Draw and Direct 3D layers (hereinafter collectively referred to as "Kernel Mode DD/D3D layers", unless only one of the two is to be described or referred to, in which they shall be respectively referred to as "Kernel Mode DD layer" and "Kernel Mode D3D layer", in all cases having the reference character 106b) corresponding to the DD/D3D interfaces 104b. The Kernel Mode also includes a display driver 108a corresponding to the GRE 106a, and Direct Draw and Direct 3D drivers (hereinafter collectively referred to as "DD/D3D drivers", unless only one of the two is to be described or referred to, in which they shall be respectively referred to as "DD driver" and "D3D driver", in all cases having the reference character 108b) corresponding to Kernel Mode DD/D3D layers 106b. Moreover, the Kernel Mode includes hardware 110 (e.g., control processor, frame buffer, etc.).

The application program 102 issues drawing commands (e.g. Draw Rectangle) to the GDI 104a. In turn, the GDI issues drawing commands, many of which, such as, for example, draw a Dialog box, must be broken down into many graphics primitives. The graphics primitives spawned by the GDI 104a are then passed to the GRE 106a. The GRE 106a calls a defined set of functions in the display driver 108a, which implement the graphics primitives spawned by the GDI 104a.

In addition, the application 102 may issue Direct X commands. With respect to the video subsystem 100, Direct Draw (DD) and Direct 3D (D3D) commands are of the most interest. To support game manufactures, which required the fastest possible access to the video hardware, the DD interface 104b was introduced. The DD interface's main function is to support fast blitting to either the memory buffer (not shown) on the video card or to system memory (not shown). This is typically accomplished by having a front buffer (what the viewer sees) and a series of back buffers. Images are rendered to a back buffer and the back buffer is then flipped to the front buffer which is then seen by the viewer. Though all primitives can be rendered on either the front or back buffer through the standard GDI pipeline as described above, several commands can be directly sent to the DD driver 108b. Some examples of these commands are bitblt (copy an image stored in either system memory or display memory to either the front or back buffer), flip (flip the front and back buffers so that the contents of the former back buffer are now viewed), wait for vertical refresh, get the scan line that is being displayed, and so on. Many of these commands allow more direct control of the display hardware 110 than was previously exposed by the Windows architecture. For the bitblt example the coordinates for the source and destination of the image are specified and the filter driver would need to set up and control the off/on screen buffers on several video cards along with any system memory buffers used for graphics. Somewhat different than the GDI case, the command set is a much more low level interface to the graphics hardware. Thus in general, GDI commands usually need to be broken down to several graphics primitives while DD and D3D commands usually do not. This lower software overhead makes DD commands faster than GDI commands.

The D3D interface 104b was developed to allow greater performance for 3D graphics. Since 3D programming is much more complicated than DD programming, layers such as Open GL and D3D Retained mode were also developed. These layers are put on top of the D3D layer and the D3D layer is typically referred to as "D3D immediate mode". In general, the API for Open GL and D3D retained mode is much more application specific while D3D immediate mode is focused on being a low level interface to the 3D graphics hardware. Similar to the GDI 104a, an Open GL or D3D Retained mode interface will generally break the command down into one to several D3D immediate mode commands. An example of a D3D immediate mode command would be to set up a specific light (ambient, point, directional, etc.) and use this for the lighting of a scene.

Modern displays adapters implement many GRE, DD, and D3D primitives in hardware to accelerate system graphics. The vendor supplied display driver 108a and DD/D3D Drivers 108b inform the GRE 106a and Kernel Mode DD/D3D layers 106b, respectively, of the hardware's capabilities. When a primitive which can be accelerated in hardware is received it is forwarded to these drivers so that they can set up the display hardware 110 to perform the command. In order to know the hardware capabilities of the specific video card there is a list of defined functions and capabilities which the vendor supplied driver can specify that its hardware supports. Many of these capabilities are optional and a few are required. The capabilities are supplied to the GRE 106a and Kernel Mode DD/D3D layers 106b either when the operating system boots up or when it utilizes those components.

Unfortunately, prior art display subsystems in general, and video display adapters in particular, are designed to address only a maximum fixed number of rows and columns. Therefore, a very large display cannot be addressed by a single video card. Thus, it would be desirable and highly advantageous to have a method for rendering display blocks on a large display of a computer processing system.

SUMMARY OF THE INVENTION

The present invention is directed to a method for rendering display blocks on a display device of a computer processing system.

In one aspect of the invention, there is provided a method for rendering display blocks on a video display device of a computer processing system having an existing display driver. The method includes the step of assigning each of a plurality of n video adapters to an $m^{th}$ display subregion of the display device. A call to a draw function supported by the existing display driver is received. The draw function corresponds to a particular shape to be drawn and includes starting and ending coordinates. The $m^{th}$ display subregion that drawing of the shape is to begin on is calculated from the starting coordinates. A function of the existing display driver is called by calling an address stored in the filter driver of a routine corresponding to the called function. The called function corresponds to the received draw function. A segment of the shape is rendered on the calculated $m^{th}$ display subregion by the $n^{th}$ display adapter corresponding thereto. A traversal is made to the $n^{th}$ video adapter corresponding to a next segment of the shape. The next segment of the shape is rendered on the $m^{th}$ display subregion corresponding to the traversed $n^{th}$ video adapter. The traversal and second rendering step are repeated until all segments of the shape have been rendered.

These and other aspects, features and advantages of the present invention will become apparent from the following detailed description of preferred embodiments, which is to be read in connection with the accompanying drawings.

BRIEF DESCRIPTION OF THE DRAWING

FIG. 7 is a flowchart of a method for rendering a rectangle on a display region of a video display device.

DETAILED DESCRIPTION OF PREFERRED EMBODIMENTS

The present invention is directed to a method for rendering display blocks on a display device of a computer processing system. The present invention allows for huge video displays, previously unaddressable by prior art display subsystems, to be addressed in a manner which takes full advantage of the maximum resolution of the video displays.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 1:
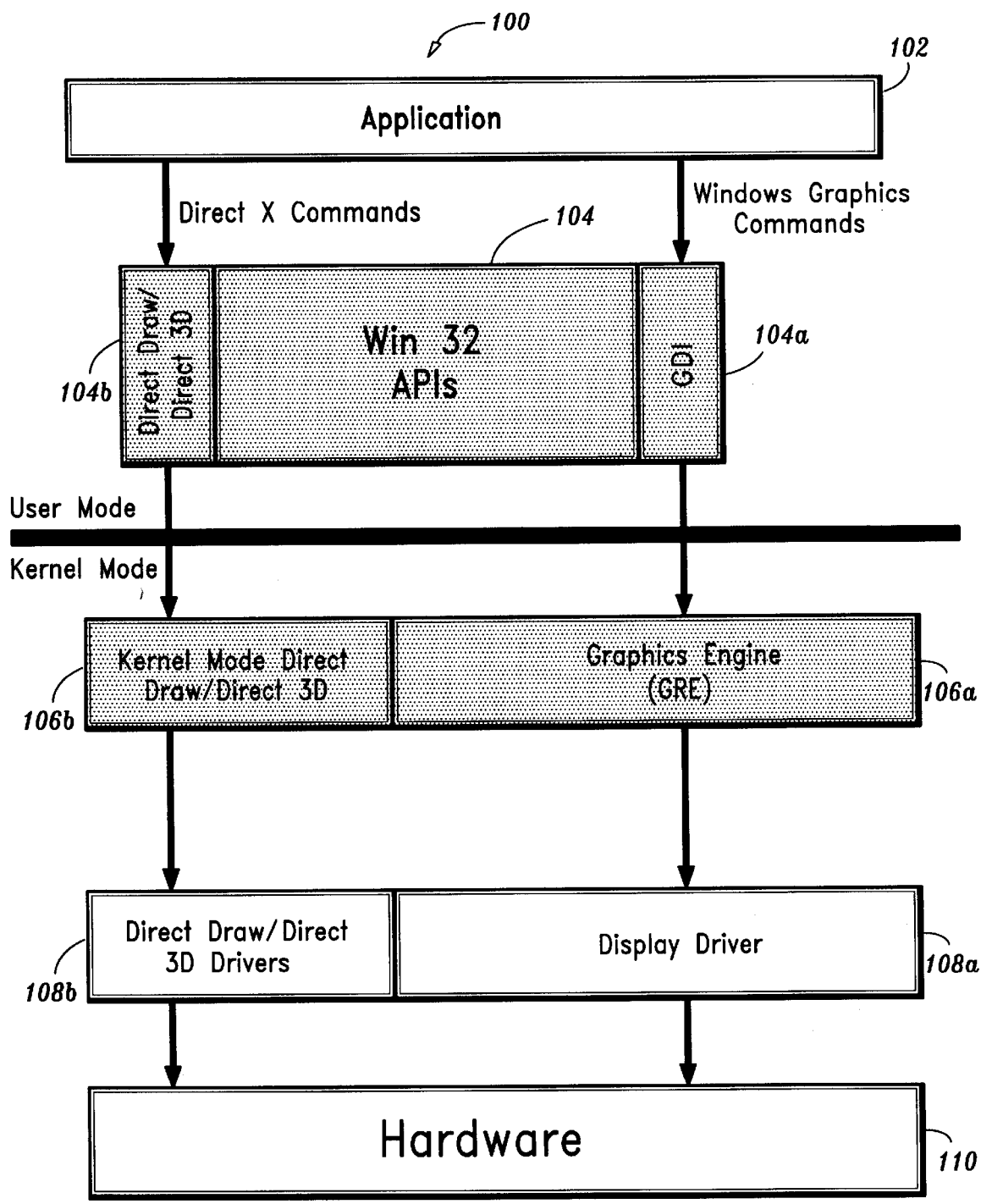
FIG. 1 is a block diagram of a display subsystem of a computer processing system according to the prior art.
Figure 2:
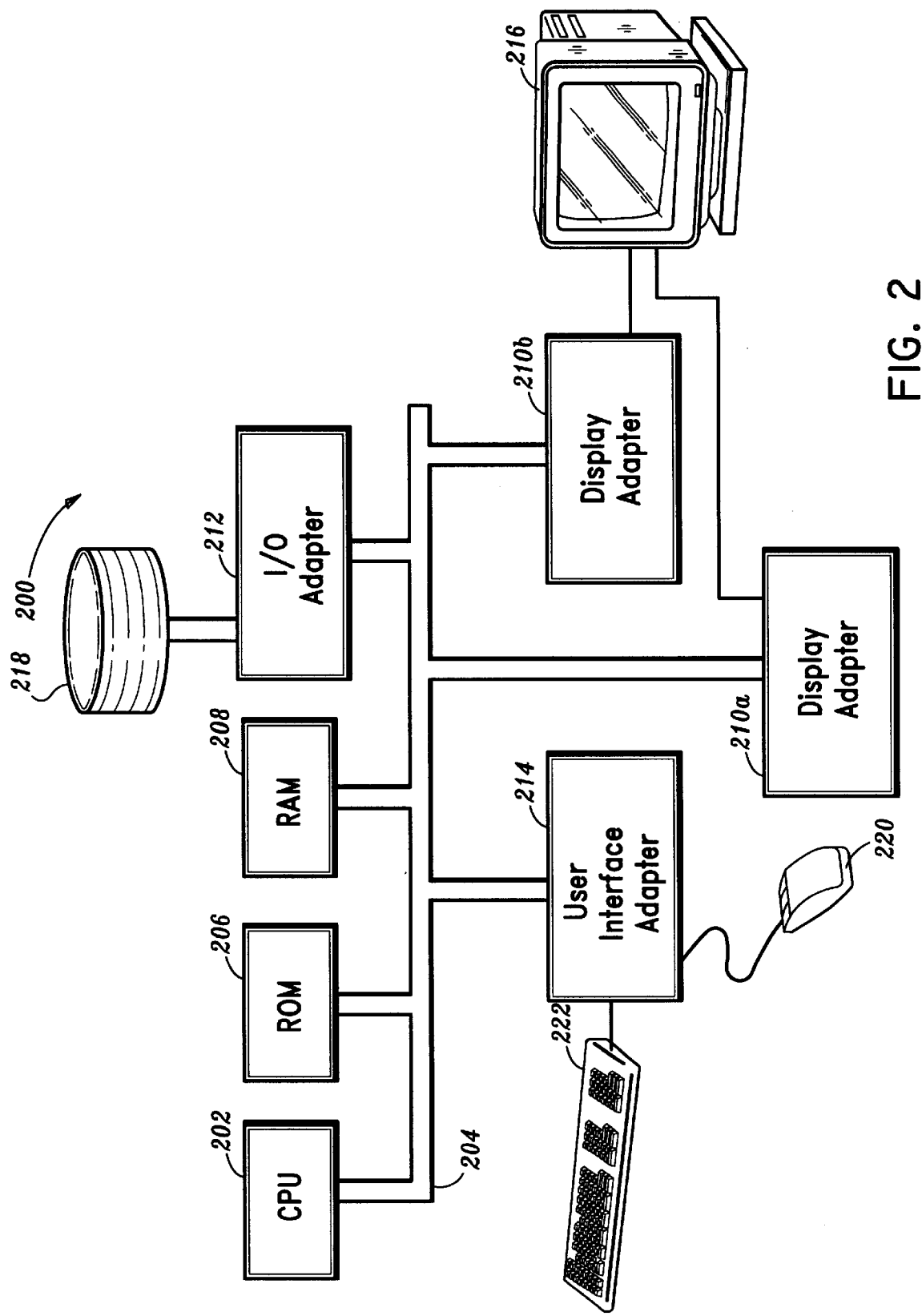
FIG. 2 is a block diagram of a computer processing system to which the present invention may be applied according to an embodiment of the present invention.

FIG. 2 is a block diagram of a computer processing system 200 to which the present invention may be applied according to an embodiment of the present invention. The computer processing system 200 includes at least one processor (CPU) 202 operatively coupled to other components via a system bus 204. A read only memory (ROM) 206, a random access memory (RAM) 208, at least two display adapters 210a and 210b, an I/O adapter 212, and a user interface adapter 214 are operatively coupled to the system bus 204. It is to be appreciated that only one display adapter need be used in a display subsystem according to the present invention. However, to reap the advantages of the present invention over corresponding prior art systems, more than one display adapter should be utilized.

A display device 216 is operatively coupled to the system bus 204 by the display adapters 210a and 210b. A disk storage device (e.g., a magnetic or optical disk storage device) 218 is operatively couple to the system bus 204 by the I/O adapter 212.

A mouse 220 and keyboard 222 are operatively coupled to the system bus 204 by the user interface adapter 214. The mouse 220 and keyboard 222 may be used to input/output information to/from the computer processing system 200.

Figure 3:
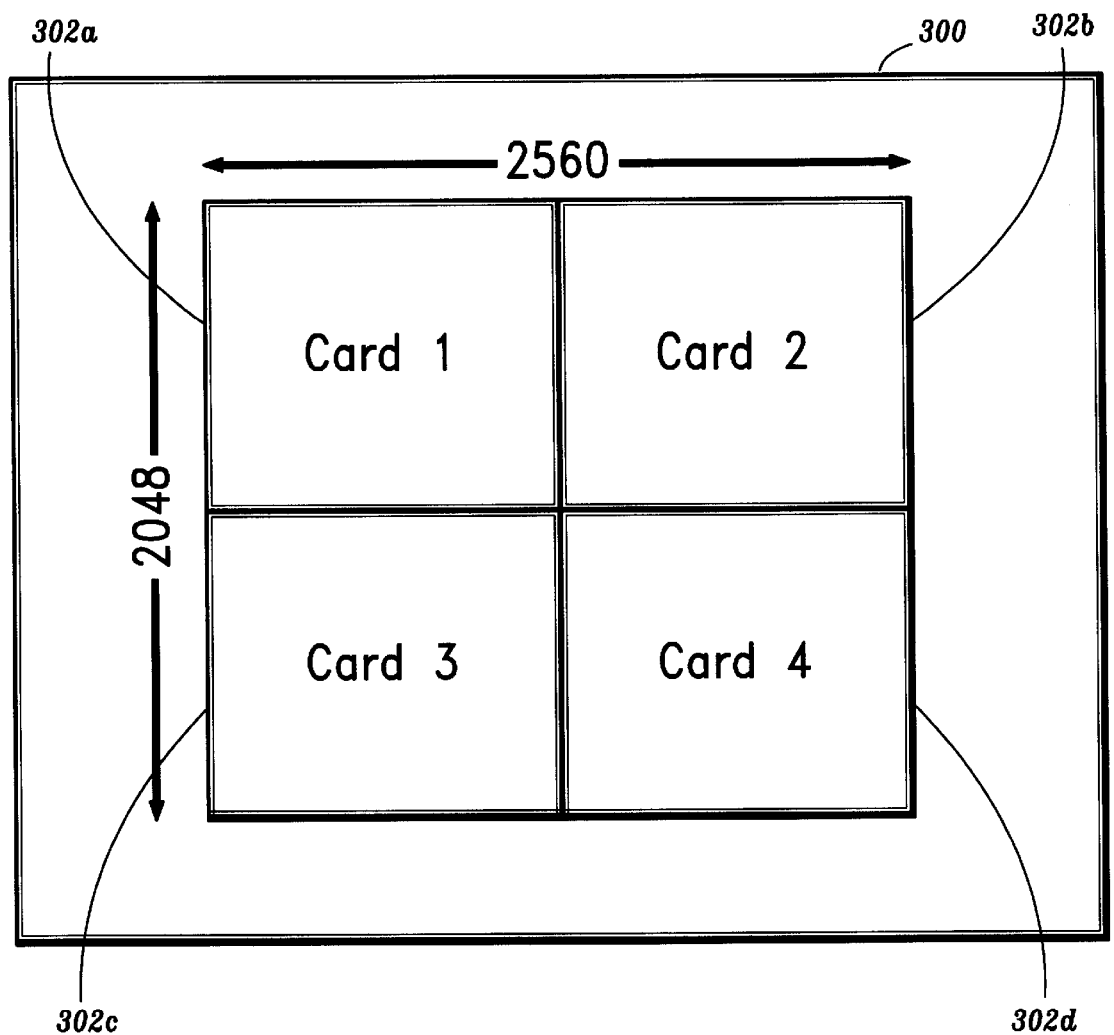
FIG. 3 is a block diagram illustrating a display region of a video display device according to an embodiment of the present invention.

FIG. 3 is a diagram illustrating a display region of a video display device 300 according to an embodiment of the present invention. The display device 300 is a liquid crystal display (LCD), and the display region corresponds to a 2560×2048 array. The display device 300 is driven by n (here, n=4) display adapters (video cards 1, 2, 3, and 4), each respectively assigned to a rectangular block (302a, 302b, 302c, and 302d) of the display.

Alternatively, we could use 4 cards each occupying a vertical slice of 640×2048 pixels or any other of the infinite possibilities of number of cards/resolution. Each display adapter is a full video card and includes a video controller, digital to analog converter (DAC), and video display memory. In the preferred embodiment, the adapter cards are all plugged into a Peripheral Component Interconnect (PCI) bus. Part of the PCI architecture ensures that each card plugged into the PCI bus can be uniquely addressed.

Figure 4:
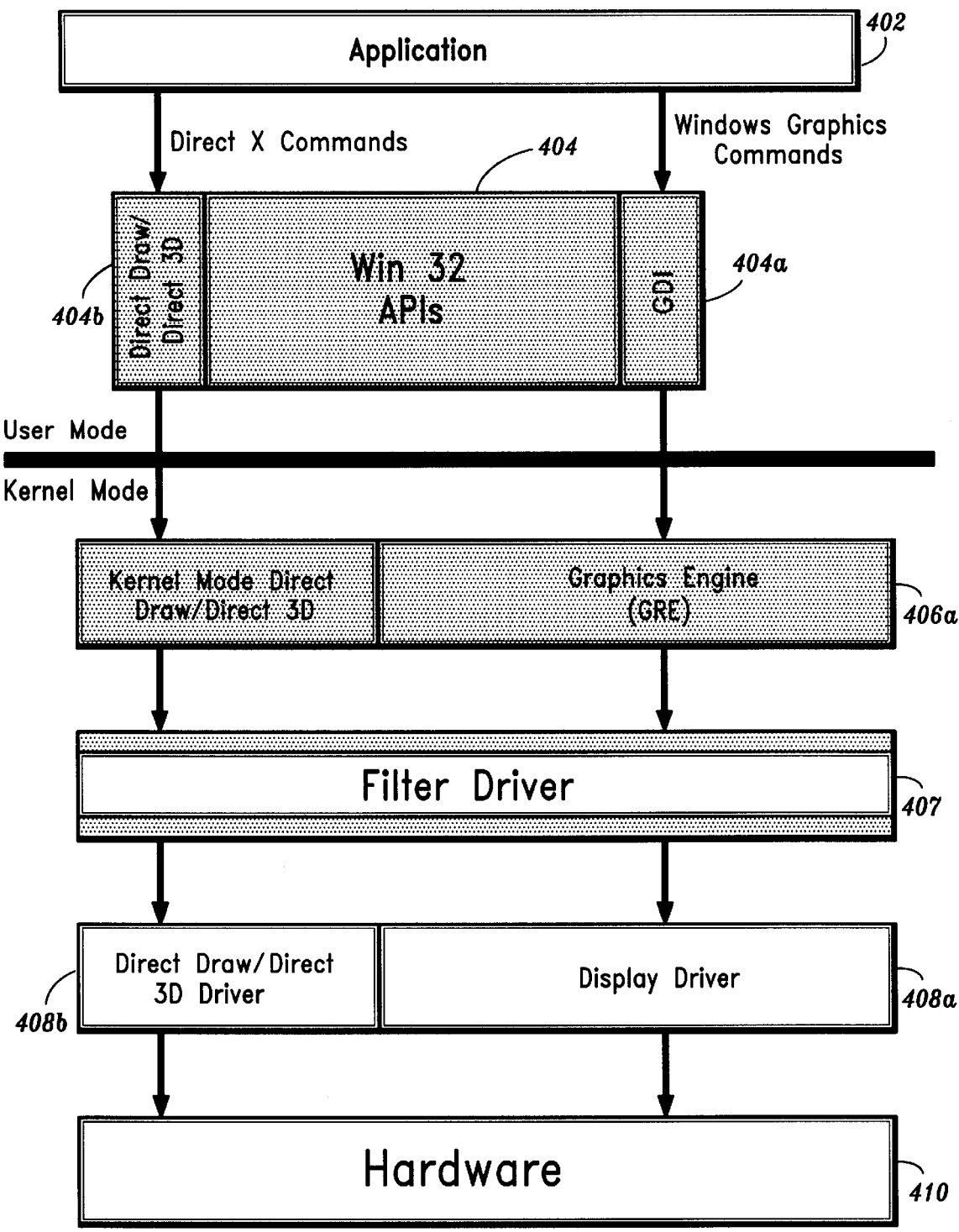
FIG. 4 is a block diagram of a display subsystem of a computer processing system according to the present invention.

FIG. 4 is a block diagram of a display subsystem 400 of a computer processing system according to the present invention. In particular, the display subsystem 400 corresponds to a computer processing system running a modern operating system, such as, for example, Windows NT. The components of the display subsystem 400 are implemented as a combination of software and hardware.

The display subsystem 400 includes a User Mode and a Kernel Mode. The User Mode includes one or more application programs (hereinafter "application program") 402, and an application level interface 404. The application level interface 404 includes a Graphics Driver Interface (GDI) 404a and a Direct Draw (DD) and Direct 3D (D3D) interface (hereinafter collectively referred to as "DD/D3D interfaces", unless only one of the two is to be described or referred to, in which they shall be respectively referred to as "DD interface" and "D3D interface", in all cases having the reference character 404b).

The Kernel Mode includes a graphics engine (GRE) 406a corresponding to the GDI 404a, and Kernel mode Direct Draw and Direct 3D layers (hereinafter collectively referred to as "Kernel Mode DD/D3D layers", unless only one of the two is to be described or referred to, in which they shall be respectively referred to as "Kernel Mode DD layer" and "Kernel Mode D3D layer", in all cases having the reference character 406b) corresponding to the DD/D3D interfaces 404b. The Kernel Mode also includes a display driver 408a corresponding to the GRE 406a, and Direct Draw and Direct 3D drivers (hereinafter collectively referred to as "DD/D3D drivers", unless only one of the two is to be described or referred to, in which they shall be respectively referred to as "DD driver" and "D3D driver", in all cases having the reference character 408b) corresponding to Kernel Mode DD/D3D layers 406b. The Kernel Mode also includes hardware 410 (e.g., control processor, frame buffer, etc.). Moreover, unlike conventional display subsystems, the display subsystem 400 according to the present invention advantageously includes a filter driver 407 which operates as described below.

The application program 402 issues drawing commands to the GDI 404a. In turn, the GDI issues drawing commands which are passed to the GRE 406a. The GRE 406a calls a defined set of functions in the display driver 408a, which implement the graphics primitives spawned by the GDI 404a.

In addition, the application 402 may issue Direct X commands, which are provided to the DD interface 404b. As stated above, the DD interface's main function is to support fast blitting to either the memory buffer (not shown) on the video card or to system memory (not shown). This is typically accomplished by having a front buffer (what the viewer sees) and a series of back buffers, operating as described above. Though all primitives can be rendered on either the front or back buffer through the standard GDI pipeline as described above, several commands can be directly sent to the DD driver 408b. Many of these commands allow more direct control of the display hardware 410 than was previously exposed by the Windows architecture.

As stated above, the D3D interface 406b was developed to allow greater performance for 3D graphics. It is to be appreciated that while FIG. 4 is specific to computer processing system running a modern operating system, such as, for example, Windows NT, some of the functionality implemented in the Kernel Mode like the GRE 406a and Kernel mode DD/D3D layers 406b can also be implemented in the User Mode.

The filter driver 407 according to an embodiment of the present invention is layered on top of the display driver 408a and DD/D3D Drivers 408b. It is the responsibility of the filter driver 407 to present all the layers above it with the impression that they are interacting with one huge display system. Upon receiving a primitive which can be implemented in hardware, it is responsibility of the filter driver 407 to break up the primitive into one or several of the same primitive and identify and dispatch the same to the card(s) which are to implement the primitive(s). This will usually require adjusting the parameters of the primitive from the huge display coordinate system to the specific card's coordinate system.

Figure 5:
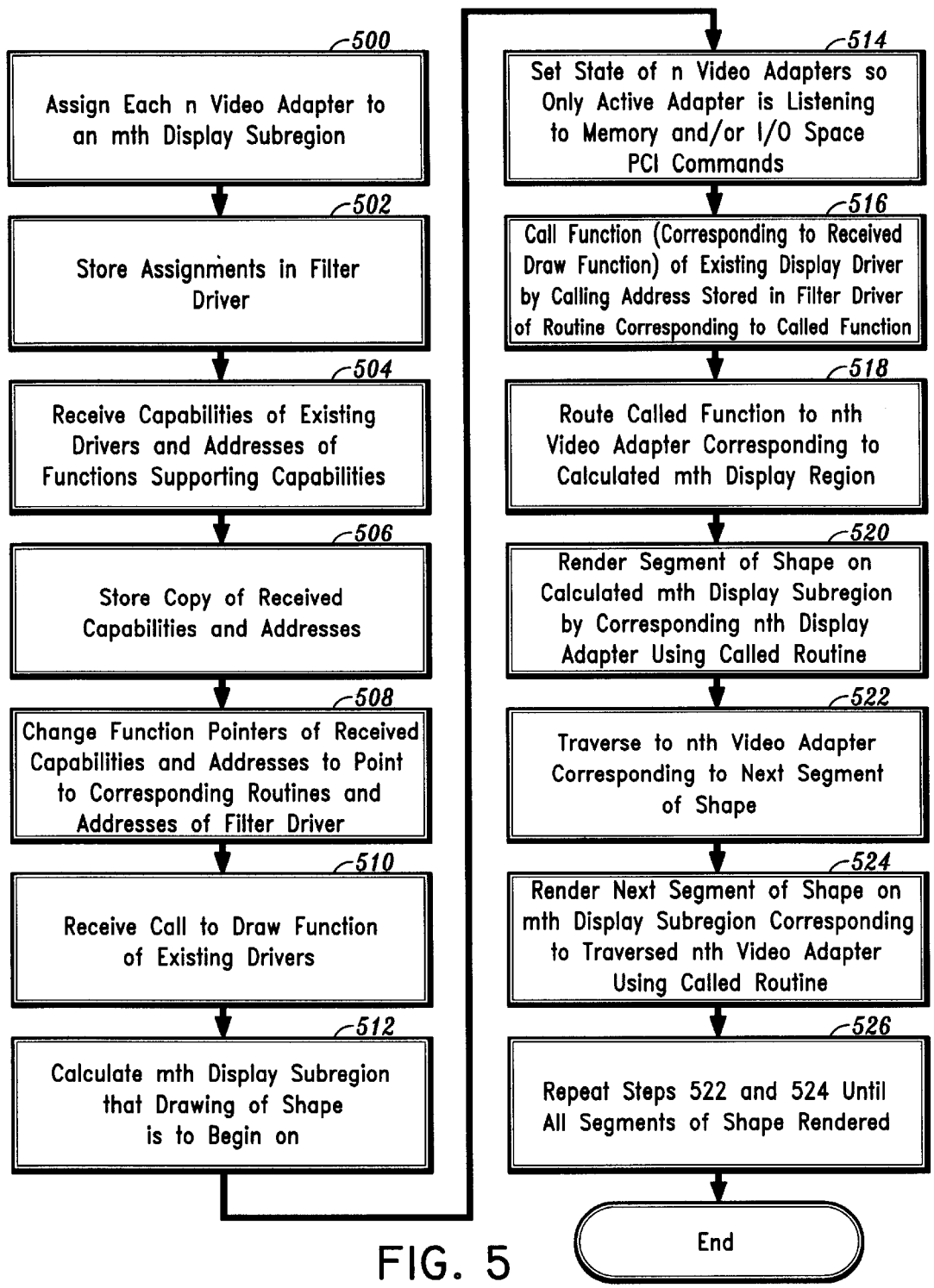
FIG. 5 is a flowchart of a method for rendering display blocks on a video display device of a computer processing system having existing display drivers.

FIG. 5 is a flowchart of a method for rendering display blocks on a video display device of a computer processing system having existing display drivers. The method includes the step of assigning each of a plurality of n video adapters to an $m^{th}$ display subregion of the display device (step 500). It is to be appreciated that while in a preferred embodiment n is equal to m, n may also be less than m so that one video adapter is assigned to more than one display subregion. The latter case may be employed, for example, when one or more of the existing video adapters fail. The assignments are stored in a filter driver (step 502).

The capabilities of the existing display drivers (i.e., display driver 408a and DD/D3D drivers 408b) and the addresses of the functions which support those capabilities are intercepted (received) by the filter driver 407 from the existing display drivers (408a, 408b) (step 504), when the GRE 406a and Kernel Mode DD/D3D layers 406b interrogate the existing display drivers (408a, 408b) for their capabilities and the addresses of the functions which support those capabilities. Generally, these capabilities and addresses are presented in a table of functions. A copy of the received capabilities and addresses is stored in the filter driver 407 (step 506), and function pointers of the received capabilities and addresses (in the table, if so presented) are changed (by the filter driver 407) to point to corresponding routines and addresses of the filter driver 407 (step 508). In this way, when a call is made to (an address of) a function supported by the display drivers, the filter driver intercepts the call and, using the address of that function which was stored at step 506, invokes the function of the display drivers.

A call to a draw function supported by the existing display drivers is intercepted (received) (step 510). The draw function corresponds to a particular shape to be drawn and includes starting and ending coordinates. The $m^{th}$ display subregion that drawing of the shape is to begin on is calculated from the starting coordinates (step 512). It is to be appreciated that if the n video adapters share the same I/O and/or screen buffer memory space, then it is also necessary to set the state of the n video adapters so that only the active video adapter (i.e., the $n^{th}$ video adapter corresponding to the calculated $m^{th}$ display subregion) is listening to memory and/or I/O space PCI commands (step 514). A function of the existing display drivers is called by calling an address stored in the filter driver of a routine corresponding to the called function (step 516). The called function corresponds to the received draw function. The called address of the routine is one that was previously stored in the filter driver at step 508. The called function is routed to the nth video adapter corresponding to the calculated mth display subregion (step 518).

A segment of the shape is then rendered on the calculated $m^{th}$ display subregion by the $n^{th}$ display adapter corresponding thereto (step 520). Such rendering is performed by the filter driver calling the draw function in the existing display drivers. A traversal is made to the $n^{th}$ video adapter corresponding to the next segment of the shape (step 522). The next segment of the shape is then rendered on the $m^{th}$ display subregion corresponding to the traversed $n^{th}$ video adapter (step 524). Again, such rendering is performed by the filter driver calling the draw function in the existing display drivers. Steps 522 and 524 are repeated until all segments of the shape have been rendered (step 526).

With respect to the routing of data to the video adapters, such as that performed at step 518, two illustrative embodiments for performing the same will now be given. In the first embodiment, a memory mapped I/O scheme is implemented such that different address spaces are assigned to different video adapters. Then, to send data to a particular video adapter(s), the data is simply routed to the address space that controls that particular video adapter.

In the second embodiment, the same address space is used for all of the video adapters. Thus, the previous active video adapter is turned off and the current active video adapter is turned on so that data is routed only to the active video adapter. This is because when all the video adapters are turned off except for the active video adapter, only the active video adapter is listening to memory and/or I/O space PCI commands. Step 514 of the method of FIG. 5 corresponds to the second embodiment, and thus may be omitted in the case of the first embodiment. For a reference describing how PCI video adapters are turned on and off, see "PCI System Architecture", Anderson et al., Addison-Wesley Publishing Co., pp. 329–333 (1995). According to the reference, when BIT 0 (I/O access enable) of the command register providing basic control over the video adapter's ability to respond to and/or perform PCI accesses is set to one, the device's I/O address decoder(s) responds to PCI I/O accesses. Alternatively, when BIT 0 is set to zero, the video adapter's I/O address decoder(s) is disabled. Moreover, when BIT 1 (memory access enable) of the command register is set to one, the video adapter responds to PCI memory accesses. Alternatively, when BIT 1 of the command register is set to zero, the video adapter's I/O address decoder(s) is disabled. The default setting for both BIT 0 and BIT 1 is zero.

To better illustrate the present invention, an illustrative example will now be given with respect to a GRE primitive and the drawing of a rectangle. As far as the GRE 406*a* knows the subsystem 400 is composed of one gigantic graphics card while it is the responsibility of the filter driver 407 to parse each draw command and route the appropriate part of the command to one or more displays for implementation. For example, draw Rectangle (hereinafter referred to as "DriverDrawRectangle") is one of the functions that is implemented in the display driver 408*a*. Without the filter driver 407, the display driver 408*a* would inform the GRE 406*a* to call the function DriverDrawRectangle to draw a rectangle. The filter driver 407 of the present invention instead informs the GRE 406*a* to call its function FilterDrawRectangle to draw a rectangle.

More specifically, when the FilterDrawRectangle receives a call to draw a rectangle from pixel coordinates (xLeft, yTop) to (xRight,yBottom), it first calculates which display the rectangle begins on. It does this by its knowledge of the segments of the display that each card handles. For example, lets say that the beginning card handles the coordinates (xLeftFirst, yTopFirst) to (xRightFirst,yBottomFirst). If, for example, the xRight position is greater than the xRightFirst, then the filter driver 407 fills in the rectangle to draw as (xLeft,yTop) to (xRightFirst,yBottom) and calls the routine DriverDrawRectangle. The filter driver 407 then traverses to the video card which handles the next segment, i.e. xRightFirst+1. Assuming that xRight is less than the right most segment that this next card handles, the filter driver 407 would modify the coordinates to (xRight+1, yTop) to (xRight,yBottom) and call the DriverDrawRectangle for this card. If the hardware and/or software supported clipping, then the coordinates would not have to be modified and the card would not display the parts of the rectangle outside of its viewable segment.

Examples of DD commands are bitblt, flip, wait for vertical refresh, get the scan line that is being displayed, and so on. For the bitblt example, the coordinates for the source and destination of the image are specified and the filter driver 407 would need to set up and control the off/on screen buffers on several video cards along with any system memory buffers used for graphics.

For a bitblt command in DD, the specified parameters are the x, y values of where the destination is to be written to and the width and height of the bitmap. In addition a pointer to the DirectDraw surface on which the bitblt is to be performed is specified. This surface could be a front or back buffer or any other memory location. From the coordinates and extents, the filter driver 407 can then calculate and/or change the coordinates and/or width and height to that of the specific card's coordinate system, and then dispatch the bitblt to the specific card(s) which needs to implement the bitblt primitive.

Read/write operations to/from the frame buffer to transfer blocks of pixels are implemented in a similar fashion. All operations of this type have a source/destination value of where the pixels should be read/written to the display. Thus, the card(s) which maps to the region of interest is identified, the identified card is made active, and the pixels are read/written to the frame buffer of the identified card.

A description of the steps performed with respect to a 3D graphics pipeline will now be given. As is known, 3D graphics primitives operate on three-dimensional objects, each object being made up of n polygons which are defined by vertices, each vertex specified by coordinates in three-dimensional object space. 3D graphics primitives are processed by a graphics pipeline that consists of many steps, which may be performed in either hardware or software depending on the hardware's capabilities. The first step is display traversal which reads in a series of primitives along with context information required to render the scene. This step is necessary since this data can be changed by an arbitrary amount between frames. The next step is modeling transformation where the vertices of the objects operated on by the primitives are transformed from the object coordinate system to the world coordinate system. Subsequently, a trivial accept/reject step may be performed whereby the primitives are tested to determine whether or not they lie wholly inside or outside of the view volume. Those a primitives which lie wholly outside the view volume can thus be rejected early in the graphics pipeline. Then, shading and lighting calculations may be performed to determine the illuminosity at the vertices of the objects in the world coordinate system. The next step is to clip the primitives against the view volume and project the objects that pass through the view volume to a screen coordinate system. This projection preferably involves a perspective projection. The final step is rasterization where the transformed primitives in the screen coordinate system are converted into pixel values taking into account the contribution of each object that passes through the view volume to any given pixel.

For a 3D pipeline, the application 3D calls are routed directly to the Kernel Mode D3D driver. Depending on the hardware capabilities of the device, it will route the commands capable of being done in hardware to the D3D part of the Display Driver. When no hardware exists, it will emulate the operation in software.

A description of two embodiments of the present invention with respect to D3D functions will now be given. In the first embodiment, all of the D3D functions in the 3D pipeline are performed in hardware. Thus, all the above described steps are sent to the device driver 408b so that it can set up the display hardware 410 to perform the following steps of D3D pipeline. Accordingly, the filter driver 407 intercepts all the calls before they reach the device driver 408b. The filter driver 407 then partitions the view volume for each card to correspond to the screen space assigned to each of the cards. Thus, for a respective card, if part of an object is in the view volume of another card(s) and not in its view volume, then the respective card can clip out the section that is in the view volume of the other card(s) in its trivial accept/reject operation. That is, for each respective card, the reject operation rejects the primitives which fall entirely outside the view volume of that card. If the primitive falls in or partially in, then it will be clipped in the clipping step further down in the 3D pipeline.

Figure 6A:
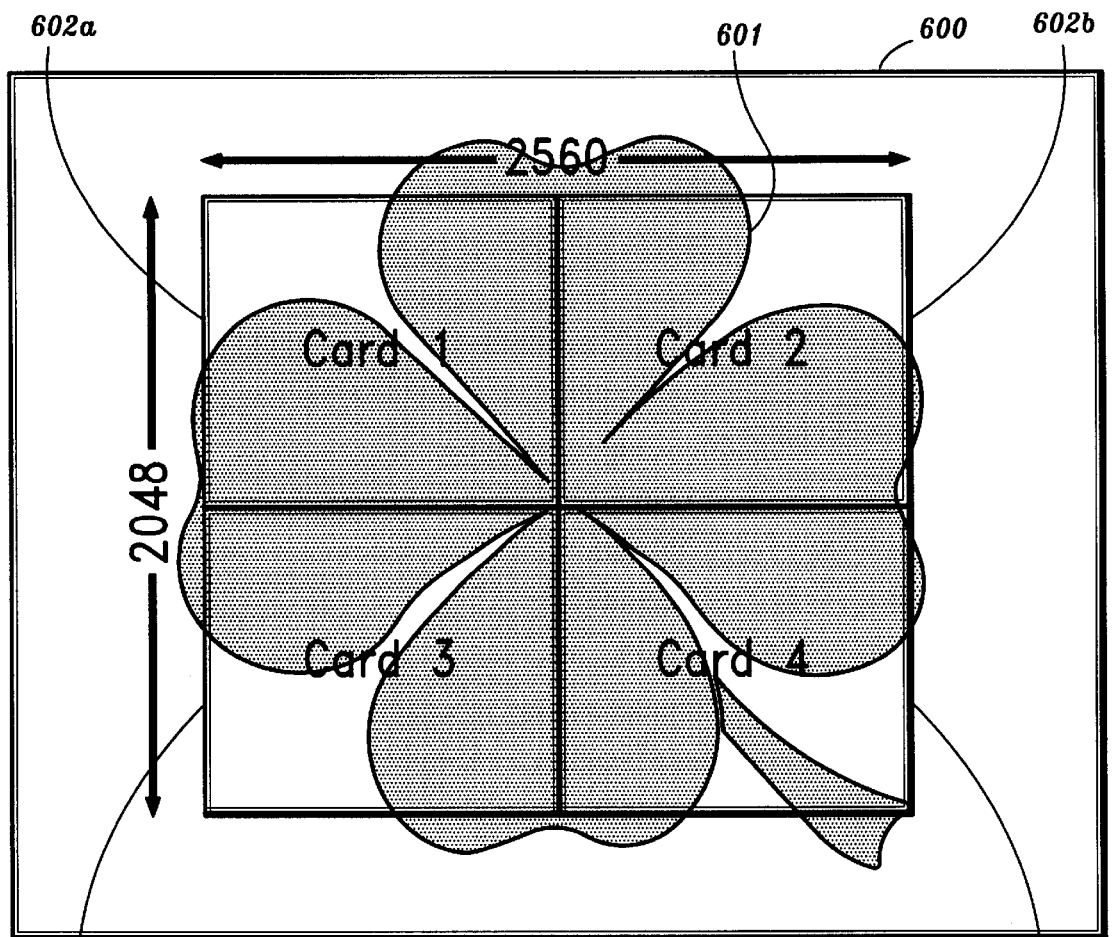
FIG. 6A is a diagram illustrating a leaf object displayed on a display region of a video display device according to an embodiment of the present invention.

FIG. 6A is a diagram illustrating a leaf object 601 displayed on a display region of a video display device 600 according to an embodiment of the present invention. The display region corresponds to a 2560×2048 array. The display device 600 is driven by 4 display adapters (video cards 1, 2, 3, and 4), each respectively assigned to a rectangular block (602a, 602b, 602c, and 602d) of the display.

Figure 6B:
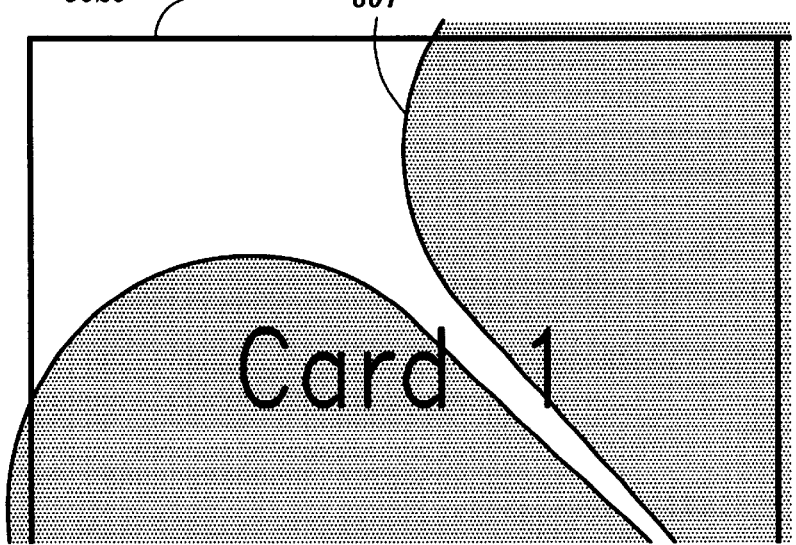
FIG. 6B is a diagram illustrating a subregion of the overall display region of the video display device of FIG. 6A.

FIG. 6B is a diagram illustrating a subregion of the overall display region of the video display device of FIG. 6A. In particular, FIG. 6B corresponds to the region (602a) of the display corresponding to video card 1.

It is to be appreciated that card 1 can map its view volume so only part of the vertexes which make up the leaf are contained within it, as shown. All the vertexes which fall on the other cards can be clipped in the trivial reject/accept step of the pipeline. In addition, we note that since we are assuming that the hardware exists on all n cards, the pipeline will be processed in parallel on all the cards considerably boosting system performance relative to having only one card.

In the second embodiment of the present invention, the system has no hardware acceleration for any of the geometric processing of D3D rendering pipeline. This in essence means that the display driver 408a is never called upon to manipulate the primitives until the last step (rasterization). In this embodiment, the filter driver 407 will essentially work in the same way that it does for a 2D graphic primitive. In particular, since only the final pixel values are being blit to the screen, the filter driver 407 will receive the display screen destination x, y coordinates and the images height and width which are to be rasterized. It will then identify the card(s) which is mapped to the region of interest, change the coordinates to the card's coordinates, make the identified card active, and write the pixels to its frame buffer. It should be noted that a real system would probably fall somewhere in the middle between these two hardware/software asymptotes.

A description of how the filter driver of the present invention is integrated into a computer processing system will now be given. According to one embodiment of the present invention, the file name of the existing display driver 408 (for example, s3.dll) is simply renamed to a different file name (for example, existDD.Dll). Then, the file name of the filter driver 407 is set to the previous file name of the existing display driver (s3.dll). When the GRE 406a calls s3.dll (which now corresponds to the filter driver 407) for its table of functions, the filter driver 407 responds by calling existDD.dll so as to provide the table corresponding to existDD.dll to the GRE 406a. This table is saved, and the GRE 406a is provided with the table of addresses of parsing functions of the filter driver 407. According to another embodiment of the present invention, the name of the file that is being called to the filter driver is changed in the system registry. It is to be appreciated that one skilled in the art will contemplate these and other methods for integrating the filter driver of the present invention into a computer processing system.

A description of how the filter driver 407 works in conjunction with other parts of the video subsystem to route the command/data to the appropriate card will now be given. When the GRE 406a calls the filter driver 407 for the first time upon booting, the filter driver 407 first scans the PCI bus looking for all video cards on the bus. Part of the spec for the PCI configuration registers identifies the type of card (video in our case). According to an embodiment of the present invention, another part of the PCI configuration registers which controls whether or not the card is "listening" to PCI commands is used to turn off and on the appropriate video card that needs to be drawn on. In the case of Windows NT, the proper way of changing the PCI configuration registers is by using the Hardware Abstraction Layer (HAL).

FIG. 7 is a flowchart of a method for rendering a rectangle on a display region of a video display device. The method includes the step of assigning each of a plurality of n video adapters to a display subregion of the display region (step 700). The assignments are stored in an array having a plurality of entries (step 702). Each entry has a first and a second x, y coordinate pair. The first x, y coordinate pair corresponds to a horizontal start point of the $n^{th}$ video adapter and a vertical start point of the $n^{th}$ video adapter. The second x, y coordinate pair corresponds to a horizontal end point of the $n^{th}$ video adapter and a vertical end point of the $n^{th}$ video adapter.

A primitive command corresponding to a rectangle is received (step 704). The primitive command includes starting coordinates (xStart, yStart) and ending coordinates. An active video adapter corresponding to a display subregion that drawing of the rectangle is to begin on is identified (step 706). The active video adapter has an n such that: the xstart coordinate is greater than or equal to the first x coordinate of the $n^{th}$ video adapter; the xstart coordinate is less than or equal to the second x coordinate of the $n^{th}$ video adapter; the ystart coordinate is greater than or equal to the first y coordinate of the $n^{th}$ video adapter; and the ystart coordinate is less than or equal to the second y coordinate of the $n^{th}$ video adapter. The n corresponding to the active video adapter is then stored (step 708).

The $n^{th}$ video adapter is set to be the active video adapter (step 710). The primitive command is routed to the active video adapter (step 712). The active video adapter is sent a draw rectangle command corresponding to the primitive command (step 714). It is then determined whether or not a rectangle horizontal end point is greater than the second x coordinate corresponding to the active video adapter (step 716). If not, then the method proceeds to step 724 (step 718). Else, the $n^{th}$ video adapter assigned to a next horizontal subregion of the display region is set to be the active video adapter (720). The method returns to step 712 (step 722).

At step 724, it is determined whether or not a rectangle vertical end point is greater than the second y coordinate corresponding to the active video adapter. If not, then the method proceeds to step 730 (step 726). Else, the $n^{th}$ video adapter assigned to a next vertical subregion of the display region is set to be the active video adapter (step 728). The method returns to step 712 (step 730). At step 732, the method terminates.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for rendering display blocks on a video display device of a computer processing system, comprising the steps of:
   (a) assigning each of a plurality of n video adapters to an $m^{th}$ display subregion of the display device;
   (b) receiving a draw command corresponding to a figure to be rendered;
   (c) parsing the draw command into draw command segments corresponding to the m display subregions and to respective portions of the figure;
   (d) routing a respective draw command segment to the $n^{th}$ video adapter assigned to the $m^{th}$ display subregion the respective draw command segment corresponds to;
   (e) rendering a portion of the figure corresponding to the respective draw command segment by the $n^{th}$ video adapter; and
   (f) repeating steps (d) and (e) until all draw command segments have been routed and all portions of the figure have been rendered.

2. A method for rendering display blocks on a video display device of a computer processing system having an existing display driver, comprising the steps of:
   (a) assigning each of a plurality of n video adapters to an $m^{th}$ display subregion of the display device;
   (b) receiving a call to a draw function of the existing display driver, the draw function corresponding to a particular shape to be drawn and including starting and ending coordinates;
   (c) calculating the $m^{th}$ display subregion drawing of the shape is to begin on from the starting coordinates;
   (d) calling a function of the existing display driver by calling an address stored in the filter driver of a routine corresponding to the called function, the called function corresponding to the received draw function;
   (e) rendering a segment of the shape on the calculated $m^{th}$ display subregion by the $n^{th}$ display adapter corresponding thereto;
   (f) traversing to the $n^{th}$ video adapter corresponding to a next segment of the shape;
   (g) rendering the next segment of the shape on the $m^{th}$ display subregion corresponding to the traversed $n^{th}$ video adapter; and
   (h) repeating steps f and g until all segments of the shape have been rendered.

3. The method of claim 2, further comprising the step of storing said assignments in a filter driver.

4. The method of claim 2, further comprising the steps of:
   (a) receiving capabilities of the existing display driver and addresses of functions associated therewith from the existing display driver, by the filter driver; and
   (b) changing function pointers of the received capabilities and addresses to point to corresponding functions and addresses of the filter driver.

5. The method of claim 4, further comprising the step of storing a copy of the received capabilities and addresses.

6. The method of claim 2, further comprising the step of routing the called function to the $n^{th}$ video adapter corresponding to the calculated $m^{th}$ display subregion.

7. The method of claim 2, further comprising the step of assigning different address spaces for each of the plurality of n video adapters.

8. The method of claim 2, further comprising the step of assigning identical address spaces for each of the plurality of n video adapters.

9. The method of claim 2, further comprising the step of setting the state of the n video adapters so only an active video adapter is listening to at least one of an input/output memory space and input/output space PCI commands, when the n video adapters share at least one of a same input/output memory space and screen buffer memory space.

10. The method of claim 2, wherein the shape is one of a two dimensional shape and a three dimensional shape.

11. The method of claim 2, further comprising the steps of:
   renaming an original file name of the existing display driver to a new file name; and
   setting a file name of the filter driver to the original name of the existing display driver.

12. The method of claim 2, further comprising the steps of:
   changing in a system registry of the computer processing system an original file name of the existing display driver to a new file name corresponding to the filter driver.

13. The method of claim 2, wherein said rendering steps comprise the step of calling the draw function in the existing display driver, by the filter driver.

14. A program storage device readable by machine, tangibly embodying a program of instructions executable by the machine to perform steps for rendering display blocks on a video display device, said method steps comprising:
   (a) assigning each of a plurality of n video adapters to an $m^{th}$ display subregion of the display device;
   (b) receiving a call to a draw function of an existing display driver, the draw function corresponding to a particular shape to be drawn and including starting and ending coordinates;
   (c) calculating the $m^{th}$ display subregion drawing of the shape is to begin on from the starting coordinates;
   (d) calling a function of the existing display driver by calling an address stored in the filter driver of a routine corresponding to the called function, the called function corresponding to the received draw function;
   (e) rendering a segment of the shape on the calculated $m^{th}$ display subregion by the $n^{th}$ display adapter corresponding thereto;
   (f) traversing to the $n^{th}$ video adapter corresponding to a next segment of the shape;
   (g) rendering the next segment of the shape on the $m^{th}$ display subregion corresponding to the traversed $n^{th}$ video adapter; and
   (h) repeating steps f and g until all segments of the shape have been rendered.

15. The program storage device of claim 14, further comprising the step of storing said assignments in a filter driver.

16. The program storage device of claim 14, further comprising the steps of:
   (a) receiving capabilities of the existing display driver and addresses of functions associated therewith from the existing display driver, by the filter driver; and (b) changing function pointers of the received capabilities and addresses to point to corresponding routines and addresses of the filter driver.

17. The program storage device of claim 16, further comprising the step of storing a copy of the received capabilities and addresses.

18. The program storage device of claim 14, further comprising the step of routing the called function to the $n^{th}$ video adapter corresponding to the calculated $m^{th}$ display subregion.

19. The program storage device of claim 14, further comprising the step of assigning different address spaces for each of the plurality of n video adapters.

20. The program storage device of claim 14, further comprising the step of assigning identical address spaces for each of the plurality of n video adapters.

21. The program storage device of claim 14, further comprising the step of setting the state of the n video adapters so only an active video adapter is listening to at least one of an input/output memory space and input/output space PCI commands, when the n video adapters share at least one of a same input/output memory space and screen buffer memory space.

22. The program storage device of claim 14, wherein the shape is one of a two dimensional shape and a three dimensional shape.

23. The program storage device of claim 14, further comprising the steps of:
   renaming an original file name of the existing display driver to a new file name; and
   setting a file name of the filter driver to the original name of the existing display driver.

24. The program storage device of claim 14, further comprising the steps of:
   changing in a system registry of the machine an original file name of the existing display driver to a new file name corresponding to the filter driver.

25. The program storage device of claim 14, wherein said rendering steps comprise the step of calling the draw function in the existing display driver, by the filter driver.

26. A method for rendering a rectangle on a display region of a video display device, comprising the steps of:
   (a) assigning each of a plurality of n video adapters to a display subregion of the display region;
   (b) storing said assignments in an array having a plurality of entries, each entry having a first and a second x, y coordinate pair, the first x, y coordinate pair corresponding to a horizontal start point of the $n^{th}$ video adapter and a vertical start point of the $n^{th}$ video adapter, the second x, y coordinate pair corresponding to a horizontal end point of the $n^{th}$ video adapter and a vertical end point of the $n^{th}$ video adapter;
   (c) receiving a primitive command corresponding to a rectangle, the primitive command including starting coordinates (xStart, ystart) and ending coordinates;
   (d) identifying an active video adapter corresponding to a display subregion drawing of the rectangle is to begin on, the active video adapter having the n such that the xstart coordinate is one of greater than and equal to the first x coordinate of the $n^{th}$ video adapter, the xstart coordinate is one of less than and equal to the second x coordinate of the $n^{th}$ video adapter, the ystart coordinate is one of greater than and equal to the first y coordinate of the $n^{th}$ video adapter, and the ystart coordinate is one of less than and equal to the second y coordinate of the $n^{th}$ video adapter;
   (e) setting the $n^{th}$ video adapter to be the active video adapter;
   (f) routing the primitive command to the active video adapter;
   (g) sending the active video adapter a draw rectangle command corresponding to the primitive command;
   (h) determining whether a rectangle horizontal end point is greater than the second x coordinate corresponding to the active video adapter;
   (i) if not, proceeding to step (l);
   (j) else, setting the $n^{th}$ video adapter assigned to a next horizontal subregion of the display region to be the active video adapter;
   (k) returning to step (f);
   (l) determining whether a rectangle vertical end point is greater than the second y coordinate corresponding to the active video adapter;
   (m) if not, proceeding to step (p);
   (n) else, setting the $n^{th}$ video adapter assigned to a next vertical subregion of the display region to be the active video adapter;
   (o) returning to step (f); and
   (p) terminating said method.

27. The method of claim 26, further comprising the step of storing the n corresponding to the active video adapter.

* * * * *